United States Patent [19]

Gerstine et al.

[11] 4,004,756
[45] Jan. 25, 1977

[54] AUTOMATIC FLIGHT CONTROL MEANS FOR ROTARY WING AIRCRAFT

[75] Inventors: Milton I. Gerstine, Wilmington, Del.; Joshua I. Goldberg, Ridgefield, Conn.; Setsuo Futatsugi, Kagamigahara, Japan; Kazuo Ueda, Kagamigahara, Japan; Ryozo Seo, Kagamigahara, Japan; Koji Iwasaki, Kagamigahara, Japan; Makoto Uemura, Kagamigahara, Japan

[73] Assignee: The Boeing Company, Seattle, Wash.

[22] Filed: Nov. 24, 1975

[21] Appl. No.: 634,380

[30] Foreign Application Priority Data

Nov. 22, 1974 Japan .................. 49-134512

[52] U.S. Cl. .................. 244/17.13; 244/182
[51] Int. Cl.² .................. B64C 19/00; G05D 1/08
[58] Field of Search .............. 244/17.13, 182, 183, 244/186, 188; 235/150.2, 150.22; 73/178 R, 178 H; 340/27 R, 27 SS

[56] References Cited

UNITED STATES PATENTS

| | | | |
|---|---|---|---|
| 2,650,046 | 8/1953 | Vanderlip | 244/182 |
| 3,649,818 | 3/1972 | Sylvander | 235/150.2 |
| 3,711,042 | 1/1973 | Rempfer | 244/17.13 |
| 3,816,716 | 6/1974 | DeGarmo | 235/150.2 |

Primary Examiner—Trygve M. Blix
Assistant Examiner—Reinhard J. Eisenzopf
Attorney, Agent, or Firm—F. J. Visek; F. J. D'Ambrosio

[57] ABSTRACT

An automatic flight controller for rotary wing aircraft having a setting apparatus for setting the device for the distance from a starting distance signal, a speed signal, and a remaining distance signal corresponding to the remaining distance from the starting spot to the hovering spot whereby the flight of the aircraft can be controlled in accordance with the remaining distance signal. A ground speed signal from a ground speed detecting device is integrated to obtain a signal corresponding to the flight distance from the starting spot and a remaining distance signal is then produced which is equal to the difference between the starting distance signal and the flight distance signal, and, through a function amplifier, a reference speed signal is obtained which corresponds to the remaining distance to be flown at every instance. This reference speed signal is compared with the actual ground speed to provide a speed difference signal which is used as a control signal for controlling the speed of the aircraft. The automatic flight controller may also provide an altitude control system for controlling the collective pitch control mechanism to obtain a desired altitude.

3 Claims, 7 Drawing Figures

4,004,756

AUTOMATIC FLIGHT CONTROL MEANS FOR ROTARY WING AIRCRAFT

BACKGROUND OF THE INVENTION

The present invention relates to automatic flight control means for rotary wing aircraft.

Conventionally, automatic flight control means for aircraft is of a type in which the aircraft is manually adjusted to a desired attitude and speed, and thereafter the control means is engaged for maintaining the adjusted attitude and speed. Therefore, in case of automatic flight control means for rotary wing aircraft, manual control must be made in order to attain a transfer from a certain flight condition into hovering and/or a transfer from hovering at a certain spot to hovering at another spot.

SUMMARY OF THE INVENTION

The present invention has an object to provide automatic flight control means for rotary wing aircraft which is different from the aforementioned conventional automatic flight control means and can provide an automatic control for a transfer from a certain flight condition into hovering at a desired spot.

Another object of the present invention is to provide automatic flight control means for rotary wing aircraft by which transfer to hovering at a desired spot can automatically be achieved simply by setting the distance to the spot.

The principal feature of the present invention is in the fact that means is provided for setting the starting distance from a control starting spot to a desired hovering spot and providing from the starting distance signal and a speed signal a remaining distance signal corresponding to the remaining distance to the hovering spot, whereby flight of the aircraft can be controlled in accordance with the remaining distance signal. In a most preferred aspect of the present invention, ground speed detecting means is provided for detecting ground speed of the aircraft and the ground speed signal is integrated by integrating means to obtain a signal corresponding to the flight distance from the control starting spot. A remaining distance signal is then produced equal to the difference between the starting distance signal and the flight distance signal. A function amplifier is provided for obtaining a signal corresponding to the square root of the distance remaining signal. The signal thus obtained is considered as being a reference speed signal corresponding to the remaining distance at every instant. The reference speed signal is compared with the actual ground speed signal to provide a speed difference signal which can be used as a control signal. Further, in accordance with the present invention, it is of course possible to provide an altitude control system including altitude sensing means and altitude setting means for controlling the collective pitch control mechanism of the rotary wing aircraft to obtain a desired altitude.

In a general single rotor type aircraft, the forward flight speed is controlled through cyclic pitch adjustment to attain a desired inclination of the rotor plane. However, in a tandem rotor type aircraft which has a pair of longitudinally spaced rotors, the forward speed control may be achieved by separately controlling the blade pitch angles of the fore and aft rotors so that the aircraft is inclined in pitching direction. Therefore, it should be contemplated in the present invention that the wording "cyclic pitch control" is broad enough to cover the aforementioned forward speed control in the tandem rotor type aircraft.

DESCRIPTION OF THE PREFERRED EMBODIMENT

Figure 1:
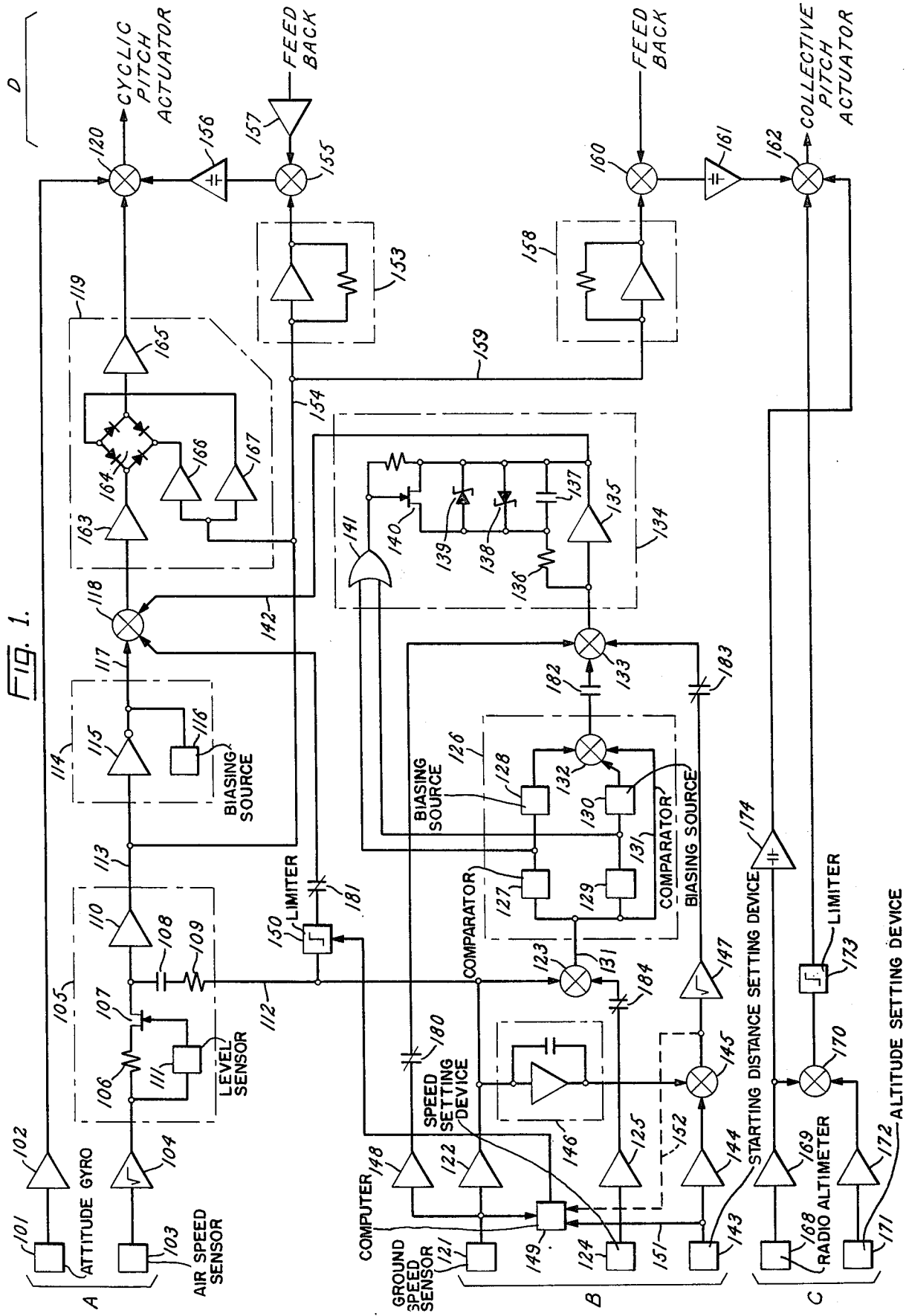
FIG. 1 is a block diagram showing the automatic flight control means in accordance with one embodiment of the present invention.

An embodiment of the present invention will now be described. In FIG. 1, there is shown in a block diagram a whole system of the automatic flight control means for rotary wing aircraft embodying the features of the present invention. The control means comprises an attitude control system A, a flight distance and ground speed control system B, an altitude control system C and a power system D.

Attitude Control System A

The attitude control system A includes an attitude gyro 101 for detecting the attitude of the rotary wing aircraft, and an air-speed sensor 103 for detecting air speed of the aircraft, the attitude gyro 101 being connected through an amplifier 102 with an adding device 120. The air speed sensor 103 may comprise differential pressure type speed detecting means such as of the Pitot tube type. In that case, detected signal is proportional to the square of the air speed of the aircraft. Therefore, in the illustrated embodiment, the output of the sensor 103 is connected with a function amplifier 104 which produces a signal corresponding to the square root of the output of the sensor 103. Thus, the output of the function amplifier 104 is proportional to the air speed. Since the Pitot tube type air speed sensor 103 has less accuracy at the low speed region, it is required to modify the output of the sensor 103 to obtain an air speed signal. For this purpose, the function amplifier 104 is connected with an air signal modifying circuit 105.

The circuit 105 includes an amplifier 110 which has an input connected with the output of the function amplifier 104 or the air speed signal through a resistor 106 and FET 107. A level sensor 111 is disposed in parallel with the resistor 106 and has an input connected with the output of the function amplifier 104 and an output connected with the gate electrode of the FET 107. The level sensor 111 serves to maintain the FET ON when the air speed signal represents a speed exceeding a predetermined value, for example, 40 KT, and to cut off the FET when the air speed signal represents a speed below the predetermined value. The input of the amplifier 110 is further connected through a line 112, a resistor 109 and a capacitor 108 with a ground speed signal line from a ground speed sensor in the flight distance control system B which will be described later. Assuming that the air speed is above the aforementioned predetermined value, for example 40 KT, the FET 107 is maintained in ON condition by the level sensor 111 so that the air speed signal is passed through the resistor 106 and the FET 107 to the input of the amplifier 110. The ground speed signal is on the other hand introduced into the resistor 109 whereby the capacitor 108 stores a voltage corresponding to the difference between the air speed signal and the ground signal. When the air speed decreases below the predetermined value, for example 40 KT, the FET 107 is cut off by the level sensor 111. Then, the input of the amplifier 110 is applied with a voltage which is the sum of the ground signal and the voltage difference between the air speed signal and the ground signal as stored in the capacitor 108. Thus, the ground speed signal is modified to produce a modified air speed signal at the amplifier 110. In this manner, when the air speed is sufficiently high so that the air speed sensor produces an output with high accuracy, for example, when the air speed is above 40 KT, the output signal of the air speed sensor is utilized as it is, while when the air speed is below 40 KT in which the air speed sensor has less accuracy, the output of the air speed sensor is not utilized but use is made of a signal which is the sum of the ground speed signal and the memorized difference between the air speed signal and the ground speed signal at the air speed of 40 KT. Therefore, it is possible to obtain an air speed signal with high accuracy throughout the whole speed range of the aircraft.

The amplifier 110 has an output line 113 which is connected with a reversing and biasing circuit 114. The circuit 114 includes an inverter 115 for reversing the air speed signal from the line 113. The circuit 114 is further provided with a biasing source 116 which applies a predetermined bias signal to the signal reversed by the inverter 115.

Figure 2:
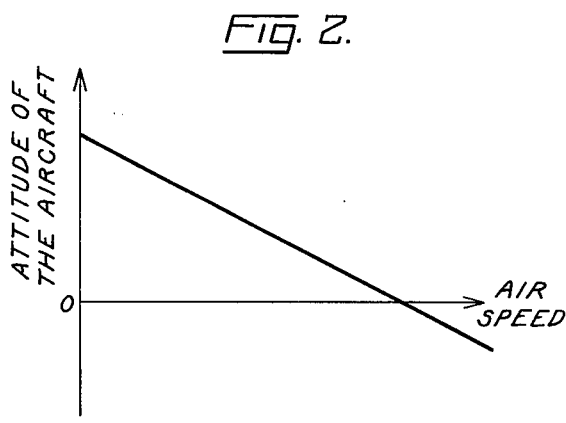
FIG. 2 is a diagram showing the relationship between the attitude and the air speed of a helicopter.
Figure 3:
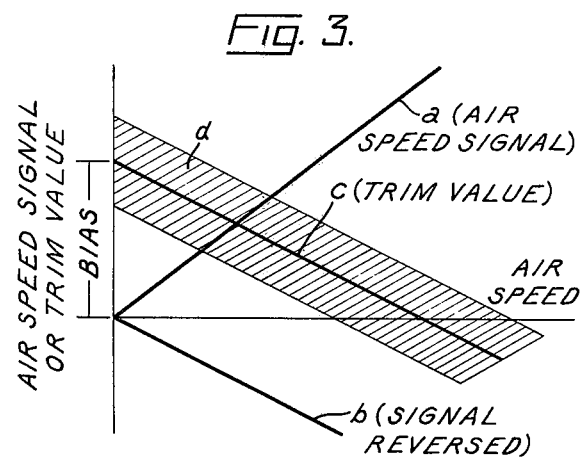
FIG. 3 is a diagram showing the process for obtaining the "trim value".

In rotary wing aircraft, it is considered that the attitude of the aircraft, that is, the angle 0 between the longitudinal center line and the horizontal line has a relationship with respect to the air speed as shown in FIG. 2. Therefore, a signal which varies as shown in FIG. 2 with reference to the air speed may be used as a reference of attitude control. The reversing and biasing circuit 114 in the embodiment is utilized for the purposes. More particularly, the air speed signal on the line 113 is linearly proportional to the air speed as shown by "a" in FIG. 3 so that the signal reversed by the inverter 115 is inversely proportional to the air speed as shown by "b" in FIG. 3. Thus, by applying a bias signal from the biasing source 116 to the reversed signal, it is possible to obtain a reference signal corresponding to the relationship between the attitude 0 and the air speed as shown by "c" in FIG. 3. In the description, the reference signal "c" is referred to as "trim value". The trim value signal is passed from the line 117 through an adding device 118 and a program limiter 119 and applied to an adding device 120 where it is compared with the attitude signal from the attitude gyro 101.

Flight Distance and Ground Speed Control System B

The system B includes a ground speed sensor 121, a speed setting device 124 and a starting distance setting device 143. The ground speed sensor 121 is connected through an amplifier 122 with an adding device 123 and the previously described air speed modifying circuit 105 of the attitude control system A. The speed setting device 124 is connected through an amplifier 125 with an adding device 123 where the ground speed signal is compared with the setting speed signal to produce a speed difference signal. For the purpose of enabling selection between the flight distance control and the ground speed control, relay contacts 180, 181, 182, 183 and 184 are provided as shown in FIG. 1. The positions of the contacts are shown in the flight distance control and their positions are reversed when the ground speed control is performed.

Figure 4A:
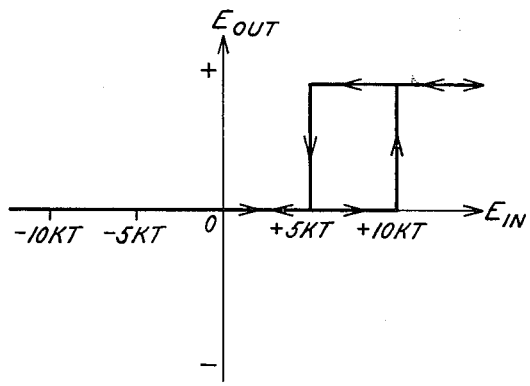
FIGS. 4A and B show output characteristics of comparators.
Figure 4B:
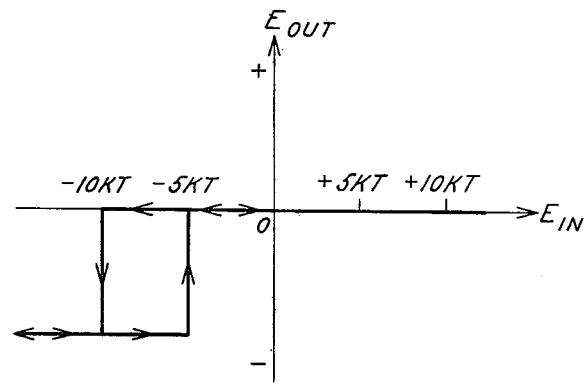

The adder 123 is connected through a biasing circuit 126 with an adding device 133. The biasing circuit 126 includes a +10 KT comparator 127, a +10 KT biasing source 128, a −10 KT comparator 129, a −10 KT biasing source 130 and an adding device 132 for adding the output from the biasing sources 128 and 130 to the speed difference signal on a line 131 connected with the adder 123. The comparators 127 and 129 have output characteristics respectively shown in FIGS. 4A and 4B. More precisely, the +10 KT comparator 127 produces its output, when the speed difference signal increases and exceeds 10 KT, to energize the +10 KT biasing source 128 so that the adder 132 is supplied with a bias signal corresponding to the speed difference of +10 KT. When the speed difference decreases and becomes less than 5 KT, the output of the comparator 127 is interrupted and the +10 KT bias signal is terminated. Similarly, the −10 KT comparator 129 produces its output, when the speed difference increases and exceeds −10 KT, so as to energize the −10 KT biasing source 130 to apply a bias signal corresponding to the speed difference of −10 KT to the adder 133. As the speed difference decreases and becomes below −5 KT, the output of the comparator 129 is interrupted and the −10 KT bias signal from the −10 KT biasing source 130 is terminated. Thus, when the value of the speed difference increases and exceeds 10 KT, the biasing source 128 or 130 produces the bias signal which is added to the speed difference signal at the adder 132. The bias signal is maintained until the value of the speed difference decreases to 5 KT and at this point the output from the biasing sources 128 and 130 is interrupted so that only the speed difference signal is allowed to pass through the adder 132 as the output from the biasing circuit 126. The purpose of the biasing circuit 126 will be referred to later. The values of the speed difference at which the comparators 127 and 129 are caused to switch should not necessarily be limited to 10 KT and 5 KT but may be changed as desired. Further, the value of the biasing signal should not necessarily correspond to the speed difference of 10 KT but any other desired value may be used. By determining the bias starting point higher than the bias terminating point as described above, it is possible to effectively prevent frequent interruption of the bias signal.

The adder 132 is connected with an adding device 133 and, it will be seen that the adder 133 is supplied with a signal which is the sum of the speed difference signal and a predetermined bias signal when the speed difference signal is above a predetermined value, while it is supplied with only the speed difference signal when the signal is below the predetermined value. The adder 133 is connected with a limited integrating circuit 134.

The circuit 134 comprises an integrator including an amplifier 135, a resistor 136 and a capacitor 137, oppositely directed Zener diodes 138 and 139 which are connected in parallel with the capacitor 137, an FET 140 connected in parallel with the capacitor 137, and an OR circuit 141 having an output connected with the gate of the FET 140 and inputs connected with the outputs of the comparators 127 and 129. Thus, when there is an output signal in either of the comparators 127 and 129, the output signal is transmitted through the OR circuit 141 to the FET 140 to turn on the FET 140 whereby the capacitor 137 is bypassed. Therefore, the circuit 134 does not function as an integrator. As noted from FIG. 1, the integrating circuit 134 shows proportional input-to-output characteristics when the FET 140 is OFF and the output of the circuit exceeds the voltage drop of the diodes 138 and 139, and the input-output characteristics become "proportion plus integration" when the output of the circuit is lower than the voltage drop of the diodes. In preferred arrangements, when the input of the circuit corresponds to the speed difference of 5 KT, the output voltage is substantially equal to the voltage drop of the diodes.

Thus, the circuit 134 shows an integrating function only when it is supplied with a speed difference signal corresponding to 5 KT, but functions as a simple amplifier, when the speed difference is above the aforementioned value or either of the comparators 127 and 129 is producing an output, so as to pass therethrough the speed difference signal from the adder 133. The output of the integrating circuit 134 is transmitted through a line 142 to the adding device 118.

The starting distance setting device 143 is connected through an amplifier 144, an adding device 145 and a function amplifier 147 with the adder 133, and the amplifier 122 of the ground speed sensor 121 has an output line connected through an integrator 146 with an adding device 145. The integrator 146 serves to integrate the ground speed signal, starting from the time of distance setting by the distance setting device 143 and engagement of the flight distance control system, so as to produce a flight distance signal. The flight distance signal is compared at the adding device 145 with the starting distance signal from the starting distance setting device 143 to produce a remaining distance signal which is transmitted to the function amplifier 147. The function amplifier 147 produces a signal corresponding to the square root of the remaining distance signal. The signal from the function amplifier can be used as a reference ground speed signal in the flight distance control mode and is transmitted to the adding device 133. The reference ground speed signal is compared with the ground speed signal transmitted from the ground speed sensor 121 through the amplifier 148 to the adder 133.

Between the ground speed sensor 121 and the starting distance setting device 143, there is disposed a computer 149 which controls a limiter 150 having an input connected with a ground speed signal line 112 and an output connected with the adder 118. The computer 149 serves to calculate the constant rate of deceleration required for reaching the hovering spot, from the ground speed at the time of engagement of the distance setting device 143 and the starting distance. The constant deceleration signal thus produced is applied to the limiter 150 which further receives the ground speed signal from the line 112 and sends to the adder 118 a signal representing the constant deceleration rate. Thus, it will be noted that a signal corresponding to a constant deceleration is constantly applied from the limiter 150 to the adding device 118 and, when it is sensed that the ground speed at any instant is different from the reference ground speed, the difference signal is applied from the line 142 to the adding device 118. If desired, the line 151 connecting the distance setting device 143 and the computer 149 may be omitted, and a line 152 may be provided for connecting the output of the adding device 145 with the computer 149.

Program Limiter 119

As previously described, the attitude of the aircraft normally has a certain relationship with the air speed (FIG. 2), and any signal deviating from the relationship produces a speed correction signal. If the speed correction signal is excessively large, abrupt speed change will be produced. Therefore, it is required to limit the output of the adder 118 between upper and lower limits which are determined in accordance with the air speed in each instance. The program limiter 119 is provided for this purpose and serves to limit the signal in the shadowed region "$d$" in FIG. 3 which has a constant width at each side of the line "$c$" representing the trim value. The program limiter 119 includes two amplifiers 163 and 165 and a diode bridge 164 disposed between the amplifiers. The diode bridge 164 has opposed terminals which are connected respectively through a lower limit setting device 166 and an upper limit setting device 167 with the air speed signal line 113.

The lower limit and upper limit setting devices 166 and 167 produces a lower level signal and an upper level signal, respectively, which are respectively applied to the lower limit terminal and the upper limit terminal so as to limit the output signal of the amplifier within the lower and upper limits. Limiters of this type are widely employed in the art so that further descriptions will be omitted.

Altitude Control System C

The altitude control system C includes a radio altimeter 168 and an altitude setting device 171, the radio altimeter 168 having an output connected with an amplifier 169 and the altitude setting device 171 having an output connected with an amplifier 172. The amplifiers 169 and 172 produce outputs which are transmitted to an adding device 170 where these output signals are compared to form an altitude difference signal. The altitude difference signal from the adding device 170 is transmitted through a limiter 173 to an adding device 162. The limiter 173 serves to limit the altitude difference signal within a predetermined range so as to appropriately limit the rate of descent or rate of ascent. The altitude signal transmitted from the altimeter 168 through the amplifier 169 is passed into a differential circuit 174 to produce an altitude changing rate signal which is in turn sent to the adding device 162.

Power System D

The power system D includes a cyclic pitch actuator for controlling the horizontal speed and a collective pitch actuator for controlling the altitude. The output of the adder 120 is utilized to operate the cyclic pitch actuator and the output of the adder 162 is utilized to operate the collective pitch actuator. The movement of the cyclic pitch actuator is fed back through an amplifier 157 to an adding device 155. A broken line function amplifier 153 is connected through a line 154 with the air speed signal line 113 and has an output line connected with the adding device 155. The cyclic pitch actuator system is constituted in integrating mode so that nominal errors can substantially be eliminated. Therefore, the feed back signal from the actuator is passed from the adder 155 to a differential circuit 156 from which the signal is applied to the adding device 120.

Figure 5:
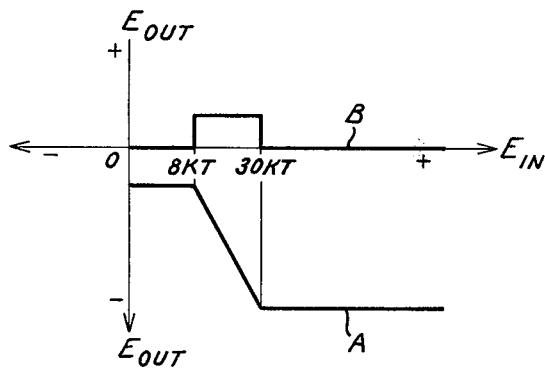
FIGS. 5 and 6 are diagrams showing the output characteristics of the cyclic pitch control system and the collective pitch control system and the signals obtained by differentiating the outputs of the systems.

The broken line function amplifier 153 is energized when the distance setting device is engaged to perform a transfer from a certain flight condition to hovering, and has a broken line function as shown by a line A in FIG. 5. More particularly, when the air speed is below a certain speed, for example 8 KT, or above another speed, for example 30 KT, it produces a constant output, while when the air speed is between the two speeds, for example between 8 and 30 KT, it produces an output which is proportional to the input. The amplifier 153 is brought into operation when there is a change in the air speed. For example, during the transfer into hovering, it produces a constant output until the speed decreases to 30 KT so that there is no output signal from the differential circuit 156. When the air speed is between 8 and 30 KT, there is an increase in the output of the function amplifier 153 so that the differential circuit 156 produces an output as shown by line B in FIG. 5 in accordance with the rate of change in the air speed signal. The line B represents a case in which the air speed changes at a constant rate. The output signal of the differential circuit 156 is applied through the adder 120 to the actuator so as to apply a nose-up control to the helicopter for momentarily increasing deceleration effort immediately before the hovering spot.

Figure 6:
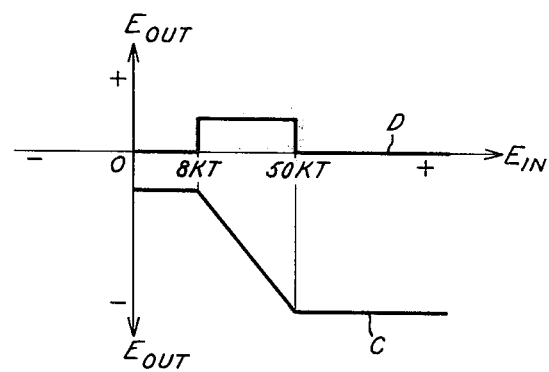

The amount of movement of the collective pitch actuator is fed back through an adding device 160 to a differential circuit 161 which has an output connected with the adder 162. There is also provided a broken line function amplifier 158 which has an input connected through a line 159 with the line 154 to receive the air speed signal and an output connected with the adding device 160. The amplifier 158 is adapted to operate during speed change and, as shown by a line C in FIG. 6, provides a constant output irrespective of the input when the air speed is out of a certain range, for example between 8 and 50 KT, while it produces an output proportional to the input when the air speed is in the above range, for example, 8 to 50 KT. The output of the amplifier 158 is applied through the adder 160 to the differential circuit 161, whereby the circuit 161 produces an output proportional to the rate of change in air speed in response to the input from the amplifier 158, as shown by a line D in FIG. 6, only when the air speed is between 8 and 50 KT. When the air speed is out of the range, there is no output from the circuit 161 in response to the input from the amplifier 158. In this manner, in transferring to hovering, it is possible to perform collective pitch control for increasing the thrust of the rotor when the aircraft approaches the hovering spot.

Operation

Ground Speed Control

In controlling the ground speed, the speed setting device 124 is adjusted to a desired speed and the speed control system is engaged. Then, the ground speed signal is transmitted from the sensor 121 through the amplifier 122 to the adder 123 where the signal is compared with the speed reference signal transmitted from the speed setting device 124 through the amplifier 125. Thus, the adder 123 produces a speed difference signal which corresponds to the difference between two signals. The speed difference signal is fed to the biasing device 126 and, when the speed difference is greater than a predetermined value, for example 10 KT, the speed difference signal is added with a bias signal corresponding to a predetermined speed, for example 10 KT while, when the speed difference is smaller than the predetermined value, the speed difference signal is passed as it is through the device 133 into the limited integrating circuit 134. In the circuit 134, the FET 140 is turned on by the signal from the OR circuit 141, when the speed difference is greater than a predetermined value, for example 10 KT, to bypass the integrator 135. Further, even when the FET 140 is turned off, the circuit 134 does not function as an integrator if the speed difference signal corresponds, in this example, to 5 to 10 KT, but the circuit 134 can function as an integrator only when the speed difference is less than 5 KT. Thus, when the speed difference is decreasing, the speed difference signal is added with a bias signal corresponding, in this example, to 10 KT by means of the biasing circuit 126 until the speed difference decreases as low as 5 KT and the speed difference signal is integrated by the integrator 135 when the speed difference is less than, in this example, 5 KT. The resultant signal is then fed through the line 142 to the adding device 118.

The "trim value" signal produced in the reversing and biasing circuit 114 is added at the adder 118 to the signal from the line 142 and introduced into the program limiter 119 where the signal is limited between the upper and lower limits which are determined in accordance with the air speed in each instance. The signal which is allowed to pass through the program limiter 119 is fed to the adder 120 as a command signal. In the adder 120, the command signal is compared with the attitude signal transmitted from the attitude gyro 101 through the amplifier 102, and the resultant difference signal is utilized to energize the cyclic pitch actuator.

In the illustrated embodiment, the speed difference signal is added with a bias signal of a predetermined amount, for example, the one corresponding to 10 KT when the speed difference is greater than a predetermined value, for example, 5 KT. This is effective to have the ground speed brought to the desired speed at a faster rate. When the speed difference has decreased below 5 KT, the bias signal is interrupted and the speed difference signal is integrated and utilized to control the operation of the cyclic pitch actuator, so that it is possible to control the ground speed to a desired speed with minimum overshooting or hunting. Since the reversing and biasing circuit 114 is provided for forming a "trim value" signal which is compared with the attitude signal, it is possible to perform a control with minimum influence of direction and speed of wind. For example, assuming that the aircraft is flying at a ground speed of 70 KT with a front wind of 30 KT, the trim value signal from the circuit 114 is counterbalanced under a normal condition by the attitude signal from the attitude gyro 101. When the wind has then suddenly ceased, in an aircraft having a conventional control system, there will be increase in the ground speed and the speed increase will be detected by a ground speed sensor to produce a correction signal. However, in the embodiment described, the correction signal is produced before the ground speed increase by detecting the fact that the attitude is out of balance in relation to the air speed, so that extremely stable control can be performed. Further, in performing a control with the utilization of the trim value, the program limiter 119 is provided for limiting the correction signal within a predetermined range so that it is possible to avoid abrupt correcting operation when there is a large speed difference.

Transfer to Hovering

An important feature of the automatic flight control means in accordance with the present invention is to enable a transfer from a certain flight condition to hovering. For this purpose, the distance setting device 143 is adjusted to the distance of a desired hovering spot and the flight distance control system is engaged. The remaining distance signal from the adder 145 is introduced into the function amplifier 147 where the reference speed signal is produced by obtaining the square root of the remaining distance signal. The reference speed signal is then fed to the adding device 133. The ground speed signal from the ground speed sensor 121 is introduced through the amplifier 148 into the adder 133 where it is compared with the reference speed signal from the function amplifier 147. when there is any difference between the actual ground speed and the reference speed corresponding to the remaining distance, the speed difference signal is produced and fed through the integrating circuit 134 and the line 142 to the adding device 118. In this instance, the FET 140 is turned off when the speed difference becomes less than 5 KT and the Circuit 134 functions as an integrator.

Further, a signal is transmitted from the line 112 through the limiter 150 into the adder 118 in order to provide a constant rate of deceleration which corresponds to the distance to the hovering spot and the flight speed at the start of transfer to the hovering. At the adder 118, the signal is added with the trim value signal from the circuit 114, and the resultant signal is fed through the program limiter 119 to the adding device 120 where the signal is compared with the attitude signal from the attitude gyro 101 to provide a difference signal which is utilized to operate the cyclic pitch actuator. As the helicopter approaches the hovering spot, the function amplifier 153 and the differential circuit 156 produce a constant signal as shown by the line B in FIG. 5. The constant signal is applied to the adding device 120 for a predetermined period to momentarily operate the cyclic pitch actuator, so that a nose-up control is applied to the aircraft for momentarily increasing the deceleration rate. At the same time, the function amplifier 158 and the differential circuit 161 produce a constant signal as shown by the line D in FIG. 6, which is applied to the adding device 162 for a predetermined period for momentarily operating the collective pitch actuator so that the collective pitch is momentarily increased. Thus, it is possible to apply increased deceleration to the helicopter a short distance before the hovering spot so as to attain hovering at the spot without any overshooting.

Thus, a transfer from forward flight to hovering has been described, however, it should be noted that the principle of the present invention can also be applied to a transfer from a hovering at a certain spot to that at another spot.

Altitude Control

In altitude control, the altitude setting device 171 is adjusted to a desired altitude and the control system is engaged. The altitude signal from the altimeter 168 is fed through the amplifier 169 to the adding device 170 where it is compared with the reference altitude signal. The resultant signal is then transmitted through the limiter 173 to the adding device 162 where it is added with the signal fed through the amplifier 169 and the differential circuit 174 to be utilized for controlling the collective pitch actuator.

The altitude control may be used in combination with the ground speed control or the control of the transfer to hovering.

What is claimed is:

1. Automatic flight control means for rotary wing aircraft comprising speed detecting means for detecting speed of a rotary wing aircraft and generating a speed signal, starting distance signal generating means for providing a starting distance signal corresponding to the starting distance between a control starting spot to a desired hovering spot, reference signal generating means connected with the speed detecting means and the starting distance signal generating means for providing from the speed signal and the starting distance signal, a reference signal corresponding to the remaining distance to the desired hovering spot, and means connected with the speed detecting means and the reference signal generating means for receiving the speed signal and the reference signal therefrom to provide a difference signal whereby cyclic pitch control mechanism of the aircraft is controlled so as to attain a speed corresponding to the remaining distance.

2. Automatic flight control means in accordance with claim 1 in which said reference signal generating means comprises integrating means connected with said speed detecting means for receiving the speed signal therefrom and integrating it to provide a flight distance signal, adding means connected with said integrating means and the starting distance signal generating means for receiving said flight distance signal and said starting distance signal therefrom to provide a remaining distance signal which is a difference signal between the starting distance signal and the flight distance signal, and function amplifying means connected with said adding means for receiving said remaining distance signal and producing a reference speed signal.

3. Automatic flight control means in accordance with claim 2 further including an altitude setting means for generating a signal according to the selected altitude for the aircraft and an altitude control and sensor means for generating a signal corresponding to the actual altitude of the aircraft, a reference signal generating means for providing a signal corresponding to the difference between the actual altitude and the signal generated by the altitude setting means, and means connecting said altitude sensing device and said altitude difference signaling means to said cyclic pitch control mechanism.

* * * * *

UNITED STATES PATENT AND TRADEMARK OFFICE
CERTIFICATE OF CORRECTION

PATENT NO. : 4,004,756
DATED : January 25, 1977
INVENTOR(S) : Milton I. Gerstine et al It is certified that error appears in the above-identified patent and that said Letters Patent are hereby corrected as shown below:

In the identity of the Assignee of the above-identified patent, the correct designation should be:

The Boeing Company, Seattle, Washington; and Kawasaki Jukogyo Kabushiki Kaisha, Hyogo, Japan.

Signed and Sealed this twelfth Day of July 1977

[SEAL]

*Attest:*

RUTH C. MASON
*Attesting Officer*

C. MARSHALL DANN
*Commissioner of Patents and Trademarks*